United States Patent
Sun et al.

(10) Patent No.: US 9,894,594 B2
(45) Date of Patent: Feb. 13, 2018

(54) SYSTEM AND METHOD FOR CUMULATIVE BEACONS

(71) Applicant: Huawei Technologies Co., Ltd., Shenzhen (CN)

(72) Inventors: Sheng Sun, Kanata (CA); Osama Aboul-Magd, Kanata (CA); Jung Hoon Suh, Kanata (CA); Yan Xin, Kanata (CA); Kwok Shum Au, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 110 days.

(21) Appl. No.: 14/830,488

(22) Filed: Aug. 19, 2015

(65) Prior Publication Data
US 2016/0066313 A1    Mar. 3, 2016

Related U.S. Application Data

(60) Provisional application No. 62/043,980, filed on Aug. 29, 2014.

(51) Int. Cl.
| | |
|---|---|
| *H04W 48/08* | (2009.01) |
| *H04W 88/08* | (2009.01) |
| *H04W 48/12* | (2009.01) |
| *H04W 48/14* | (2009.01) |

(52) U.S. Cl.
CPC ............ *H04W 48/08* (2013.01); *H04W 48/12* (2013.01); *H04W 48/14* (2013.01); *H04W 88/08* (2013.01)

(58) Field of Classification Search
CPC ..... H04W 48/08; H04W 48/14; H04W 48/12; H04W 88/08
See application file for complete search history.

(56) References Cited

U.S. PATENT DOCUMENTS

| | | | |
|---|---|---|---|
| 2008/0240055 A1 | 10/2008 | Dean et al. | |
| 2011/0116435 A1* | 5/2011 | Liu | H04L 1/1664 370/312 |
| 2013/0188621 A1* | 7/2013 | Meylan | H04W 48/18 370/336 |
| 2013/0273848 A1* | 10/2013 | Kumar | H04W 72/1215 455/41.2 |

(Continued)

FOREIGN PATENT DOCUMENTS

| | | |
|---|---|---|
| GB | 2435983 A | 9/2007 |
| GB | 2507367 A | 4/2014 |

(Continued)

OTHER PUBLICATIONS

International Search Report of Patent Cooperation Treaty (PCT), International Application No. PCT/CN2015/088279, Applicant Huawei Technologies Co., Ltd., dated Oct. 28, 2015, 10 pages.

(Continued)

*Primary Examiner* — Andrew Lai
*Assistant Examiner* — Harry H Kim
(74) *Attorney, Agent, or Firm* — Slater Matsil, LLP

(57) ABSTRACT

A method for operating a first access point of a first plurality of access points comprising access points participating in cumulative beacon operations includes generating a cumulative beacon including basic service set identifiers (BSSIDs) and service set identifiers (SSIDs) of each access point in the first plurality of access points, and sending the cumulative beacon.

26 Claims, 14 Drawing Sheets

(56) References Cited

U.S. PATENT DOCUMENTS

| | | | |
|---|---|---|---|
| 2014/0269257 A1* | 9/2014 | Mandiganal | G08B 25/10 370/221 |
| 2015/0230161 A1* | 8/2015 | Park | H04W 48/16 370/338 |
| 2015/0264123 A1* | 9/2015 | Smadi | H04W 4/12 709/206 |

FOREIGN PATENT DOCUMENTS

| | | |
|---|---|---|
| WO | 2013107370 A1 | 7/2013 |
| WO | 2014106434 A1 | 7/2014 |
| WO | 2014109875 A1 | 7/2014 |

OTHER PUBLICATIONS

"IEEE Standard for Information technology—Telecommunications and information exchange between systems Local and Metropolitan area networks—Specific Requirements, Part 11: Wireless LAN Medium Access Control (MAC) and Physical Layer (PHY) Specification," IEEE P802.11-REVmc/D1.4, Apr. 2013, 3,235 pages.

Revolution Wi-Fi, "Limit SSIDs & Data Rates to Maintain Network Performance," (/revolutionwifi/2010/10/limit-ssids-data-rates-to-maintain.html), Oct. 15, 2010, 8 pages.

Yunoki, K., et al., "Real Air-time Occupation by Beacon and Probe," IEEE 11-11/1413r0, Oct. 2011, 17 pages.

* cited by examiner

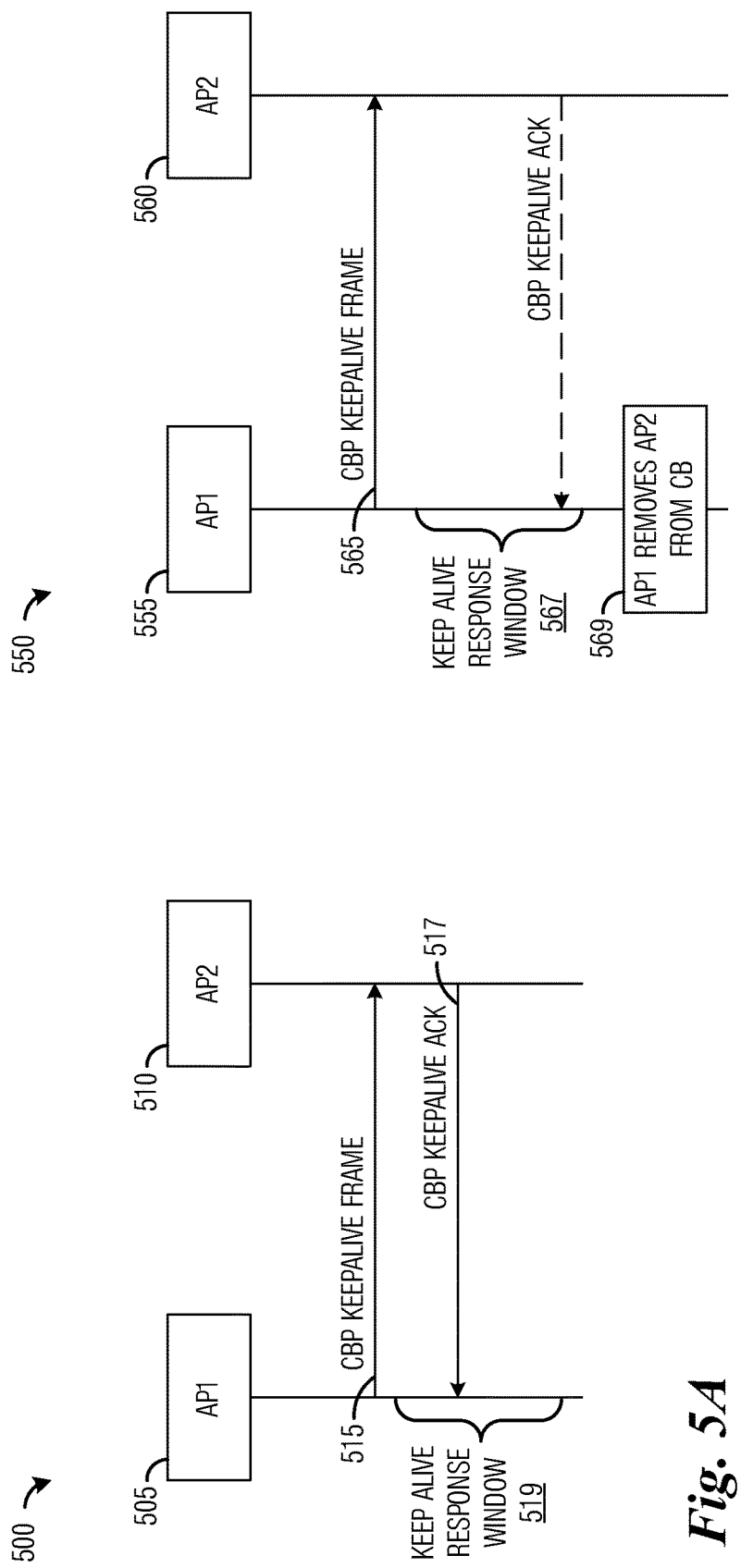

SYSTEM AND METHOD FOR CUMULATIVE BEACONS

This application claims the benefit of U.S. Provisional Application No. 62/043,980, filed on Aug. 29, 2014, entitled "System and Method for an Aggregated Beacon," which application is hereby incorporated herein by reference.

TECHNICAL FIELD

The present disclosure relates generally to digital communications, and more particularly to a system and method for cumulative beacons.

BACKGROUND

In wireless networking, an extended service set (ESS) is a set of two or more interconnected wireless basic service sets (BSSs) that share the same service set identification (SSID) and security credentials to appear as a single BSS to any station (STA) associated with one of those BSSs.

An overlapping basic service set (OBSS) is a common situation in wireless local area network (WLAN) deployments where two or more WLAN BSSs are established by independent entities (individuals, operators, etc.) in a close proximity within the interference range of one another. In an OBSS environment, access points (APs) typically do not collaborate with one another. A backhaul does not exist, so information is exchanged between competing APs over the air (OTA).

SUMMARY OF THE DISCLOSURE

Example embodiments of the present disclosure provide a system and method for cumulative beacons.

In accordance with an example embodiment of the present disclosure, a method for operating a first access point is provided. The method includes generating, by the first access point of a first plurality of access points comprising access points participating in cumulative beacon operations, a cumulative beacon including basic service set identifiers (BSSID) and service set identifiers (SSID) of access points in the first plurality of access points, and sending, by the first access point, the cumulative beacon.

In accordance with another example embodiment of the present disclosure, an access point is provided. The access point includes a processor, and a computer readable storage medium storing programming for execution by the processor. The programming including instructions to generate a cumulative beacon including basic service set identifiers (BSSID) and service set identifiers (SSID) of access points in a first plurality of access points comprising access points participating in cumulative beacon operations, and send the cumulative beacon.

In accordance with another example embodiment of the present disclosure, a method for transmitting a cumulative beacon is provided. The method includes generating, by a first access point of a plurality of access points comprising access points participating in cumulative beacon operations, a cumulative beacon including a cumulative beacon information element for each access point in the plurality of access points, and broadcasting, by the first access point, the cumulative beacon.

Practice of the foregoing embodiments provide for a reduction in communications overhead caused by multiple access points transmitting their own beacons. The reduction in communications overhead help to improve overall communications system performance and efficiency.

BRIEF DESCRIPTION OF THE DRAWINGS

For a more complete understanding of the present disclosure, and the advantages thereof, reference is now made to the following descriptions taken in conjunction with the accompanying drawing, in which:

FIG. 5A illustrates a message exchange diagram highlighting an CBP based technique for maintaining information for APs in a CB according to example embodiments described herein;

FIG. 5B illustrates a message exchange diagram highlighting an CBP based technique for maintaining information about APs from a CB and removes information about an AP from the CB according to example embodiments described herein;

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the embodiments disclosed herein, and do not limit the scope of the disclosure.

One embodiment of the disclosure relates to cumulative beacons. For example, an access point generates a cumulative beacon including basic service set identifiers (BSSIDs) and service set identifiers (SSIDs) of each access point in a first plurality of access points, wherein the first plurality of access points comprises access points participating in cumulative beacon operations, and sends the cumulative beacon.

The present disclosure will be described with respect to example embodiments in a specific context, namely communications systems that use cumulative beacons to help reduce communications overhead and improve overall efficiency. The disclosure may be applied to standards compliant communications systems, such as those that are compliant with Third Generation Partnership Project (3GPP), IEEE 802.11, and the like, technical standards, and non-standards compliant communications systems, that use cumulative beacons to help reduce communications overhead and improve overall efficiency.

Figure 1:
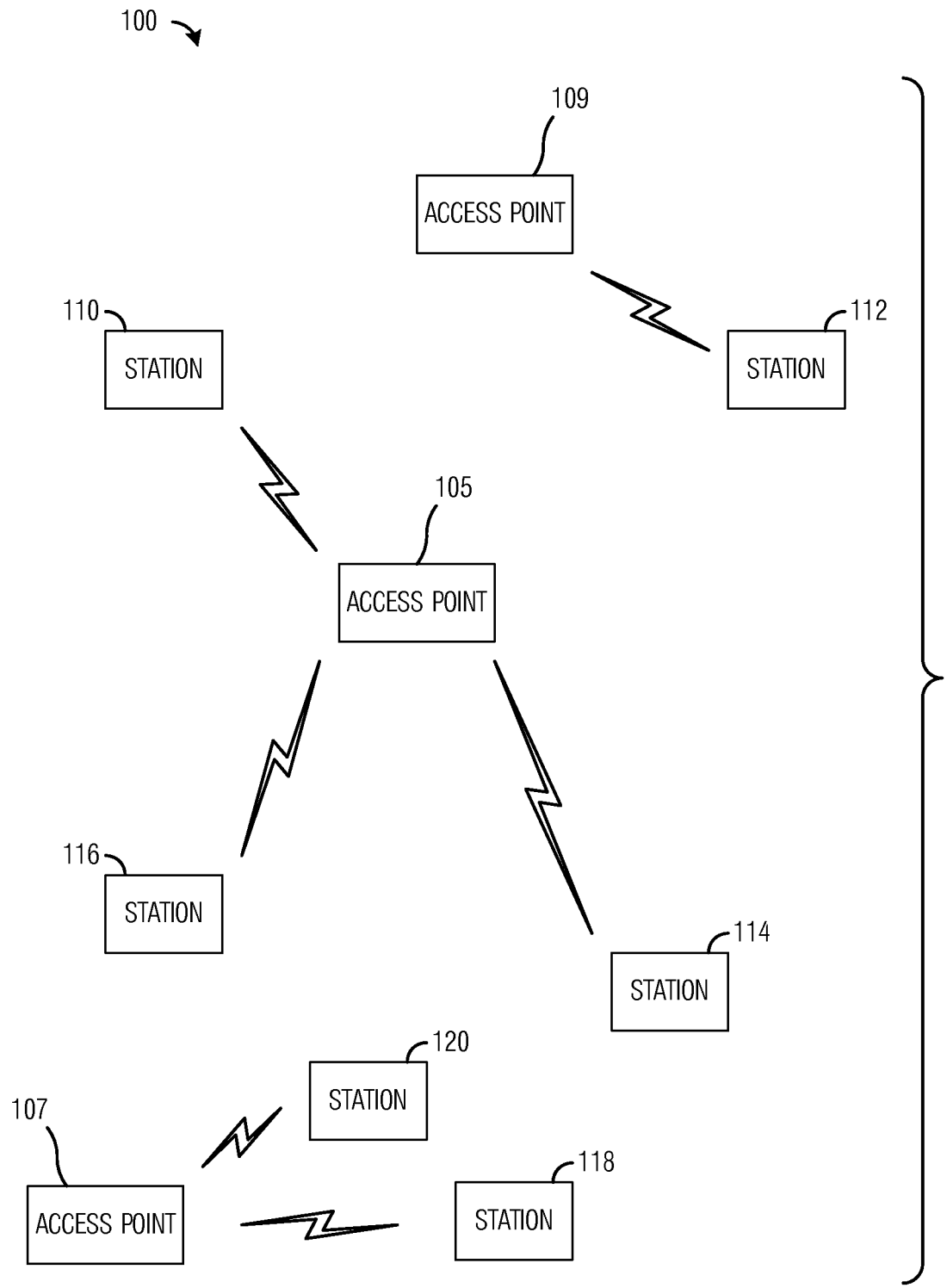
FIG. 1 illustrates an example communications system according to example embodiments described herein.

FIG. 1 illustrates an example communications system 100. Communications system 100 includes a plurality of access points (APs), including AP 105, AP 107, and AP 109. The APs serve stations, such as stations 110-120. The APs allocate communications resources for transmissions to and/or from the stations. The APs may also be commonly referred to as base stations, Node-Bs, evolved NodeBs (eNBs), transmission points, remote radio heads, and the like, while the stations may also be commonly referred to as mobiles, mobile stations, terminals, subscribers, users, wireless devices, user equipments (UEs), and so on. Communications resources may be time resources, frequency resources, code resources, time-frequency resources, spatial resources, and so forth.

While it is understood that communications systems may employ multiple APs capable of communicating with a number of stations, only three APs, and a number of stations are illustrated for simplicity.

A basic service set (BSS) is considered to be a basic building block of an IEEE 802.11 compliant wireless LAN. IEEE 802.11 compliant wireless LANs may also be referred to as WLANs, and the IEEE 802.11 may be referred to in general as Wi-Fi. A BSS may include one or more APs and all associated stations. As discussed previously, an overlapping basic service set (OBSS) includes two or more BSSs that are in sufficiently close proximity of each other so that transmissions occurring within one BSS causes interference in another BSS. Furthermore, the APs in an OBSS typically do not collaborate with one another and transmissions between the APs occur over the air (OTA).

In WLANs, the APs periodically transmit management frames commonly referred to as beacon frames. The beacon frames are sent periodically to announce the presences of the WLAN. The beacon frames may be used to synchronize, provide information about the capabilities AP, provide support for polling, encryption, and so on.

Figure 2A:
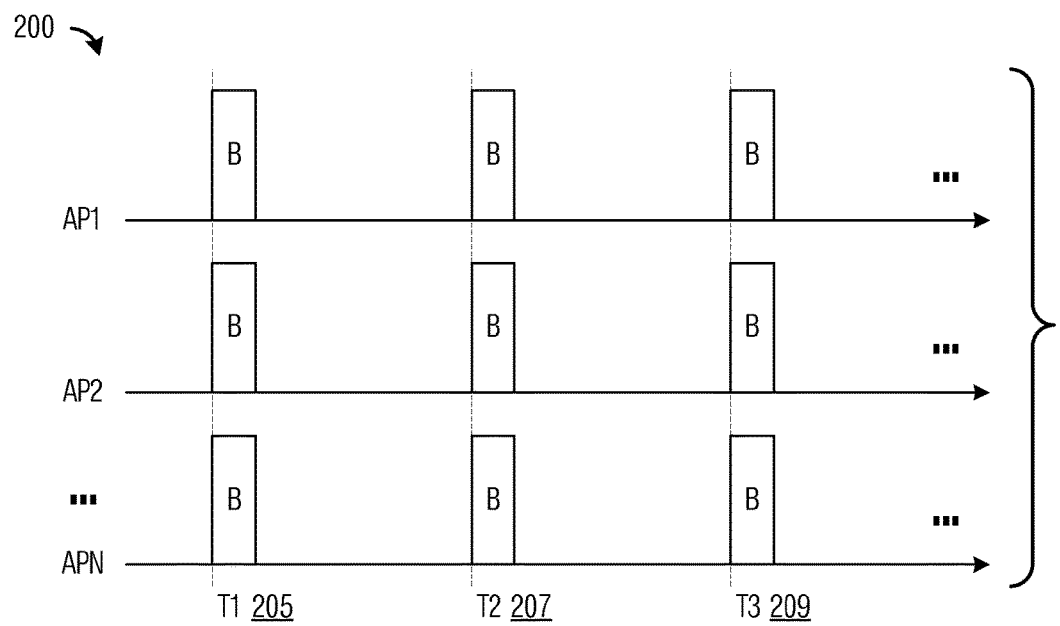
FIG. 2A illustrates a message diagram displaying beacon frames sent by APs of an OBSS according to example embodiments described herein.

Since each AP periodically sends a beacon frame, there may be a large number of beacon frames sent in an OBSS. FIG. 2A illustrates a message diagram 200 displaying beacon frames sent by APs of an OBSS. Message diagram 200 displays the beacon frames sent by N APs of the OBSS. As shown in FIG. 2A, at time T1 205, N beacon frames are sent. Similarly, at times T2 207 and T3 209, N beacon frames are sent.

The large number of beacon frames contributes significantly to communications overhead. In OBSSs, beacon frames may be the main contributor to communications overhead, which leads to significantly lower bandwidth utilization.

According to an example embodiment, it is possible to reduce the number of beacon frames sent by the APs in an OBSS by replacing the beacon frames sent by the individual APs with cumulative beacon (CB) frames that are sent by a primary announcer (a designated AP of the OBSS). A single CB frame sent by one AP may replace multiple beacon frames sent by individual APs of the OBSS, thereby reducing communications overhead.

Figure 2B:
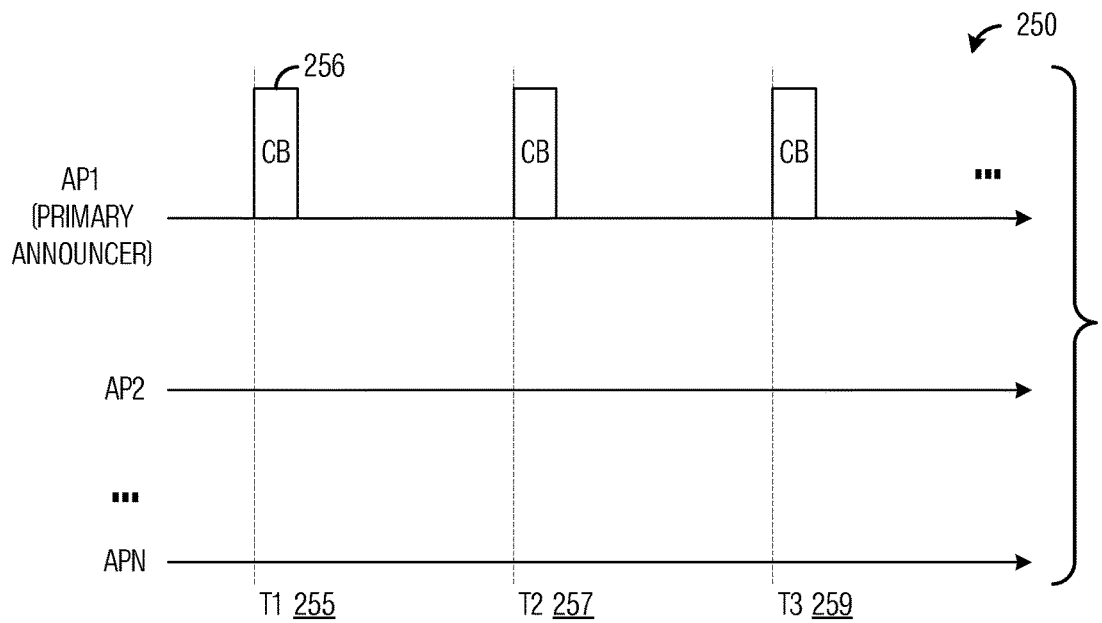
FIG. 2B illustrates a message diagram displaying CB frames sent by an AP of an OBSS according to example embodiments described herein.

FIG. 2B illustrates a message diagram 250 displaying CB frames sent by an AP of an OBSS. As shown in FIG. 2B, at time T1 255, AP1 sends a CB frame 256. CB frame 256 is sent in place of beacon frames of APs that are participating in cumulative beacon operations. As shown in FIG. 2B, CB frame 256 replaces N beacon frames that would ordinarily be sent by the N APs. Similarly, at times T2 257 and T3 259, CBs are also transmitted by AP1.

The reduction in the number of beacon frames sent from multiple APs results in higher OTA throughput efficiency. According to an example embodiment, one AP out of a plurality of APs of an OBSS that is participating in cumulative beacon operations is designated as a primary announcer. The primary announcer is designated through the use of a cumulative beacon protocol (CBP) procedure. The primary announcer sends cumulative beacon frames in place beacon frames ordinarily sent by each of the APs of the plurality of APs. According to another example embodiment, CBP is not used to designate a primary announcer. Instead of using the CBP procedure to designate the primary announcer, the primary announcer is pre-determined or pre-specified. The primary announcer may be pre-determined or pre-specified by an operator of the communications system, based on a determination rule as specified by a technical standard, and the like. The specification of the primary announcer in a pre-determined or pre-specified manner may allow for a rotation of the role of primary announcer amongst a plurality of APs, which may help to improve the coverage of the CB frames. As an illustrative example, an operator of the communications system or a technical standard specifies a sequence of APs that will become primary announcers and backup announcers. Each of the APs in the sequence of APs may serve as primary announcer for a specified amount of time, a specified number of CBs transmitted, or until an event occurs, for example. Then, as different APs in the sequence of APs become the primary announcer, the CB frames are sent from different parts of the OBSS, thereby helping to improve the coverage of the CB frames.

According to an example embodiment, the CB frames are broadcasted over a single channel. The CB frames are broadcasted by the primary announcer over a single channel, such as a primary channel. Although the AP performing the role of the primary announcer may change over time, the CB frames broadcasted by the different APs serving as the primary announcer may be broadcast over a single channel, such as the primary channel. Alternatively, different APs serving as the primary announcer may broadcast the CB frames on different channels, but generally, each AP will broadcast the CB frames on a single channel.

Figure 3:
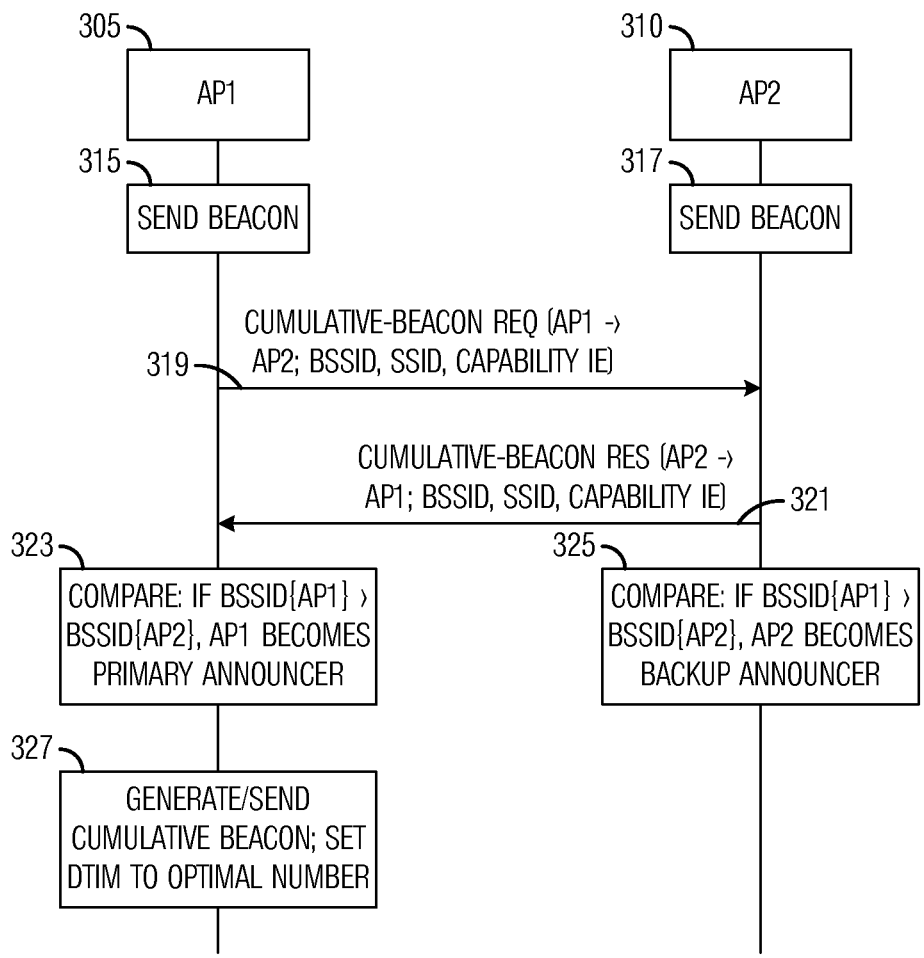
FIG. 3 illustrates a message exchange diagram highlighting an example CB transmission according to example embodiments described herein.

FIG. 3 illustrates a message exchange diagram 300 highlighting an example cumulative beacon frame transmission. Message exchange diagram 300 displays transmissions and operations occurring at a first access point (AP1) 305 and a second access point (AP2) 310. AP1 305 and AP2 310 may be part of an OBSS, therefore, they are within interference range of each other.

AP1 305 and AP2 310 may begin with AP discovery, which may include the APs sending their beacon frames (shown as blocks 315 and 317) so that other APs may be able to discover their presence. AP1 305 may send a cumulative beacon request frame to AP2 310 (shown as event 319). The cumulative beacon request frame may include a basic service set identifier (BSSID) of AP1 305, a service set identifier (SSID) of AP1 305, a capability information element (IE) of AP1 305, and so on. AP2 310 may respond to the cumulative beacon request frame by sending a cumulative beacon response frame (shown as event 321). The cumulative beacon response frame may include the BSSID of AP2 310, the SSID of AP2 310, a capability IE of AP2 310, and so forth.

AP1 305 and AP2 310 may begin a CBP procedure to designate a primary announcer (blocks 323 and 325). The CBP procedure to designate the primary announcer may be a distributed process that occurs at the individual APs without requiring additional collaboration or communications. According to an example embodiment, the APs compare their BSSID with the BSSID of the other APs and the AP with the largest BSSID becomes the primary announcer. According to another example embodiment, the AP with the smallest BSSID is the primary announcer.

Additionally, the CBP procedure to designate the primary announcer also designates a backup announcer. The backup announcer may take the place of the primary announcer if the primary announcer becomes inactive. According to an example embodiment, the AP with the smallest BSSID is the backup announcer in the situation when the AP with the largest BSSID is the primary announcer. According to another example embodiment, the AP with the largest BSSID is the backup announcer in the situation when the AP with the smallest BSSID is the primary announcer.

For discussion purposes, assume that the BSSID of AP1 305 is larger than the BSSID of AP2 310. Therefore, AP1 305 is designated as the primary announcer. AP2 310 is designated as the backup announcer since in the example illustrated in FIG. 3, there are only two APs participating in cumulative beacon operations. The sending of the cumulative beacon request frame, the cumulative beacon response frame, and the CBP procedure to designate the primary announcer may be collectively referred to as CBP initialization.

AP1 305 may generate a CB and send it in a CB frame (block 327). The CB may include BSSIDs and SSIDs of each AP participating in cumulative beacon operations, as determined in AP discovery. The CB may also include CB IEs for each AP participating in cumulative beacon operations. Detailed discussion of the configuration of example CBs is provided below.

Figures 4A, 4B:
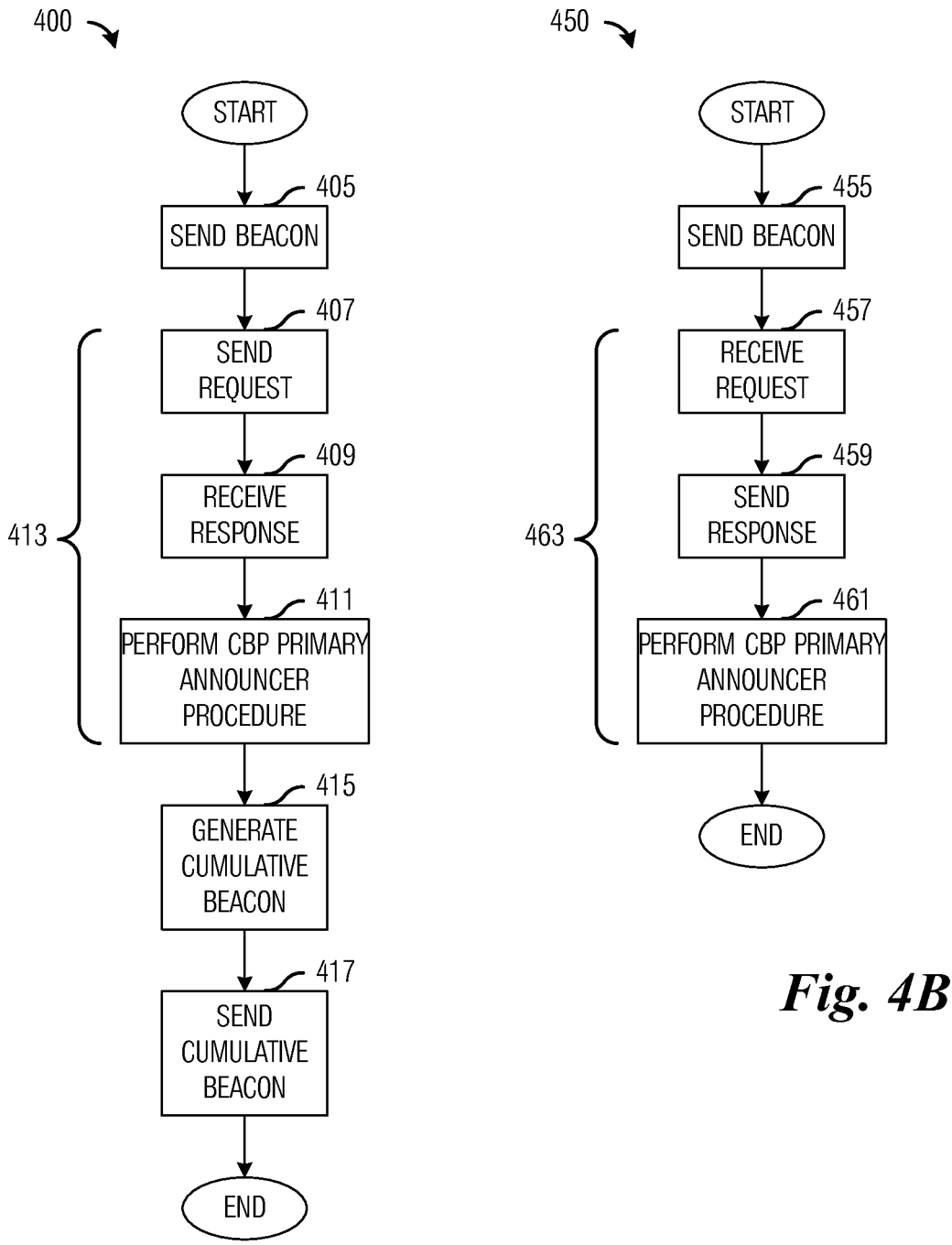
FIG. 4A illustrates a flow diagram of example operations occurring in an AP that operating as a primary announcer as the AP participates in cumulative beacon operations according to example embodiments described herein.
FIG. 4B illustrates a flow diagram of example operations occurring in an AP that operating as a backup announcer as the AP participates in cumulative beacon operations according to example embodiments described herein.

FIG. 4A illustrates a flow diagram of example operations 400 occurring in an AP that operating as a primary announcer as the AP participates in cumulative beacon operations. Operations 400 may be indicative of operations occurring in an AP operating as a primary announcer as the AP participates in cumulative beacon operations.

Operations 400 may begin with the AP sending a beacon frame (block 405). The sending of the beacon frame may be part of an AP discovery process, enabling APs within interference range of one another to detect the presence of other APs. The AP may send a cumulative beacon request frame (block 407). The cumulative beacon request frame may include a BSSID of the AP, a SSID of the AP, a capability IE of the AP, and so on. The AP may receive one or more cumulative beacon response frames (block 409). The cumulative beacon response frames may include BSSIDs of the APs sending the cumulative beacon response frames, SSIDs of the APs sending the cumulative beacon response frames, capability IEs of the APs sending the cumulative beacon response frames, and so forth. The AP may perform a CBP primary announcer procedure (block 411). As an illustrative example, the AP is designated the primary announcer after performing the CBP primary announcer procedure. The AP may generate a CB (block 415). The CB may include BSSIDs and SSIDs of each AP participating in cumulative beacon operations, as determined in AP discovery. The CB may also include CB IEs for each AP participating in cumulative beacon operations. The AP may send the CB in a CB frame (block 417). The CB frame may be broadcasted, on a primary channel, for example.

FIG. 4B illustrates a flow diagram of example operations 450 occurring in an AP that operating as a backup announcer as the AP participates in cumulative beacon operations. Operations 450 may be indicative of operations occurring in an AP operating as a backup announcer as the AP receives a CB.

Operations 450 may begin with the AP sending a beacon frame (block 455). The sending of the beacon frame may be part of an AP discovery process, enabling APs within interference range of one another to detect the presence of other APs. The AP may receive a cumulative beacon request frame (block 457). The cumulative beacon request frame may include a BSSID of a source AP, a SSID of the source AP, a capability IE of the source AP, and so on. The AP may send a cumulative beacon response frame (block 459). The cumulative beacon response frame may include a BSSID of the AP, a SSID of the AP, a capability IE of the AP, and so forth. The AP may perform a CBP primary announcer procedure (block 461). As an illustrative example, the AP is designated the backup announcer after performing the CBP primary announcer procedure.

According to an example embodiment, a CBP based technique for updating information (e.g., BSSID, SSID, and cumulative beacon IE) for an AP in a CB is provided. On occassion, it is necessary to update the information for an AP in CBs is needed. As an illustrative example, an AP becomes inactive or otherwise inoperable and the information about the AP may be removed from the CB. A similar situation may exist when an AP no longer participates in cumulative beacon operations but otherwise remains active.

FIG. 5A illustrates a message exchange diagram 500 highlighting a CBP based technique for maintaining information for APs in a CB. Message exchange diagram 500 displays transmissions and operations occurring at a first access point (AP1) 505 and a second access point (AP2) 510.

For discussion purposes, it is assumed that AP1 505 is operating as a primary announcer and AP2 510 is one AP participating in cumulative beacon operations. AP1 505 may, periodically, send a CBP keepalive frame (shown as event 515). The CBP keepalive frame may be broadcast or multi-cast. The periodicity of the CBP keepalive frame may be set by an operator of the communications system or specified in a technical standard, for example. AP1 505 may receive a CBP keepalive acknowledgement (ACK) from AP2 510 (shown as event 517). The CBP keepalive ACK is used to indicate that AP2 510 is active and wants to continue participation in cumulative beacon operations. Since AP2 510 is active and wants to continue participation in cumulative beacon operations, AP1 505 keeps information about AP2 510 in the CB. The CBP keepalive ACK may need to be received by AP1 505 within a time-window (shown as keep alive response window 519) in order to positively acknowledge that AP2 510 is to be kept in the CB. If CBP keepalive ACK is received after the time-window expires, the CBP keepalive ACK is treated by AP1 505 as if it had not been received at all.

Although the discussion focusses on a two AP situation, the example embodiments presented herein are operable for any plurality of APs. Therefore the discussion of interaction between two APs should not be construed as being limiting to either the scope or the spirit of the example embodiments.

FIG. 5B illustrates a message exchange diagram 550 highlighting an CBP based technique for maintaining information about APs from a CB and removes information about an AP from the CB. Message exchange diagram 550 displays transmissions and operations occurring at a first access point (AP1) 555 and a second access point (AP2) 560.

For discussion purposes, it is assumed that AP1 555 is operating as a primary announcer and AP2 560 is one AP participating in cumulative beacon operations. AP1 555 may, periodically, send a CBP keepalive frame (shown as event 565). The CBP keepalive frame may be broadcast or multi-cast. After sending the APB keepalive frame, AP1 555 may start a time-window (shown as keep alive response window 567) to track when CBP keepalive ACKs (if any) are received. As shown in FIG. 5B, no CBP keepalive ACK is received from AP2 560 within the time-window (the missing CBP keepalive ACK is shown in FIG. 5B as a dashed line). Therefore, AP1 555 may remove information about AP2 560 from the CB (block 569). In general, AP1 555 expects to receive CBP keepalive ACKs from each AP participating in cumulative beacon operations. AP1 555 retains information of the APs from which it receives CBP keepalive ACKs within the time-window and removes information of the APs from which it did not receive CBP keepalive ACKs or receives after the time-window expires.

Figures 6A, 6B:
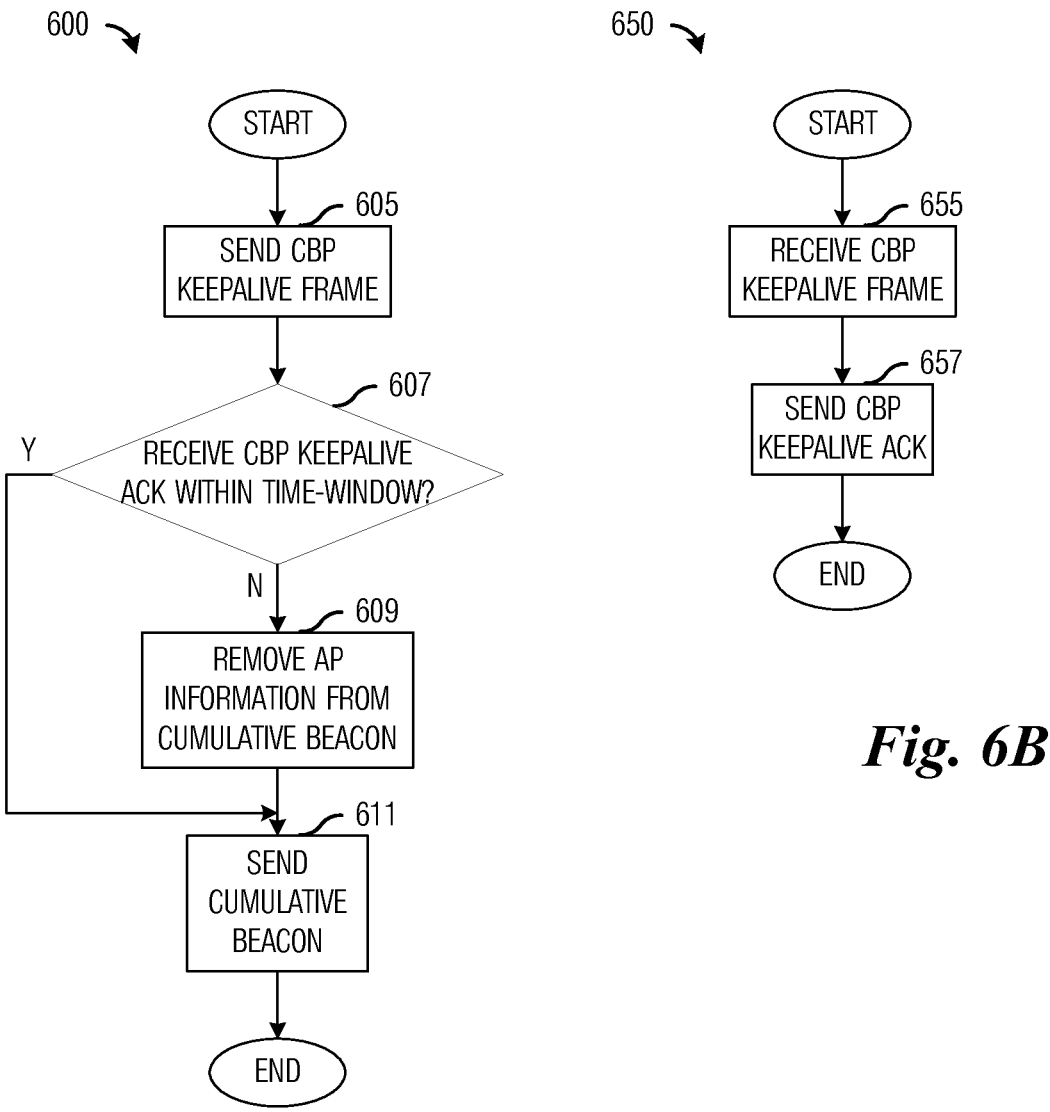
FIG. 6A illustrates a flow diagram of example operations occurring in an AP operating as a primary announcer as the AP participates in an CBP based technique for maintaining information for APs in a CB according to example embodiments described herein.
FIG. 6B illustrates a flow diagram of example operations occurring in an AP not operating as a primary announcer as the AP participates in an CBP based technique for maintaining information for APs in a CB according to example embodiments described herein.

FIG. 6A illustrates a flow diagram of example operations 600 occurring in an AP operating as a primary announcer as the AP participates in a CBP based technique for maintaining information for APs in a CB. Operations 600 may be indicative of operations occurring in an AP operating as a primary announcer as the AP participates in a CBP based technique for maintaining information for APs in a CB.

Operations 600 may begin with the AP sending a CBP keepalive frame (block 605). The CBP keepalive frame may be broadcast or it may be multi-cast to the APs participating in cumulative beacon operations. The AP may perform checks to determine if it receives CBP keepalive ACKs from the APs participating in cumulative beacon operations within a specified time-window (block 607). If the AP has not received a CBP keepalive ACK from a particular AP within the specified time-window, the AP removes information about the particular AP from the CB (block 609). If there are more than one APs that did not respond with CBP keepalive ACKs within the specified time-window, information about the more than one APs are removed from the CB. For the APs that did respond with CBP keepalive ACKs within the specified time-window, their respective information is left in the CB. The AP may send the CB in a CB frame (block 611).

FIG. 6B illustrates a flow diagram of example operations 650 occurring in an AP not operating as a primary announcer as the AP participates in a CBP based technique for maintaining information for APs in a CB. Operations 650 may be indicative of operations occurring in an AP not operating as a primary announcer as the AP participates in a CBP based technique for maintaining information for APs in a CB.

Operations 650 may begin with the AP receiving a CBP keepalive frame (block 655). The CBP keepalive frame may be broadcast or muli-cast to the AP. The AP may respond by sending a CBP keepalive ACK (block 657). Alternatively, if the AP no longer wants to participate in cumulative beacon operations, the AP may choose to not send the CBP keepalive ACK.

According to an example embodiment, a CBP based technique for a backup announcer to take the place of a primary announcer is presented. Since a single AP (i.e., the primary announcer) is responsible for transmitting the CB for a plurality of APs participating in cumulative beacon operations, a backup announcer is needed to ensure continued operation should the primary announcer stops operations. A distributed CBP based technique is used to minimize collaboration and coordination between the plurality of APs.

Figure 7:
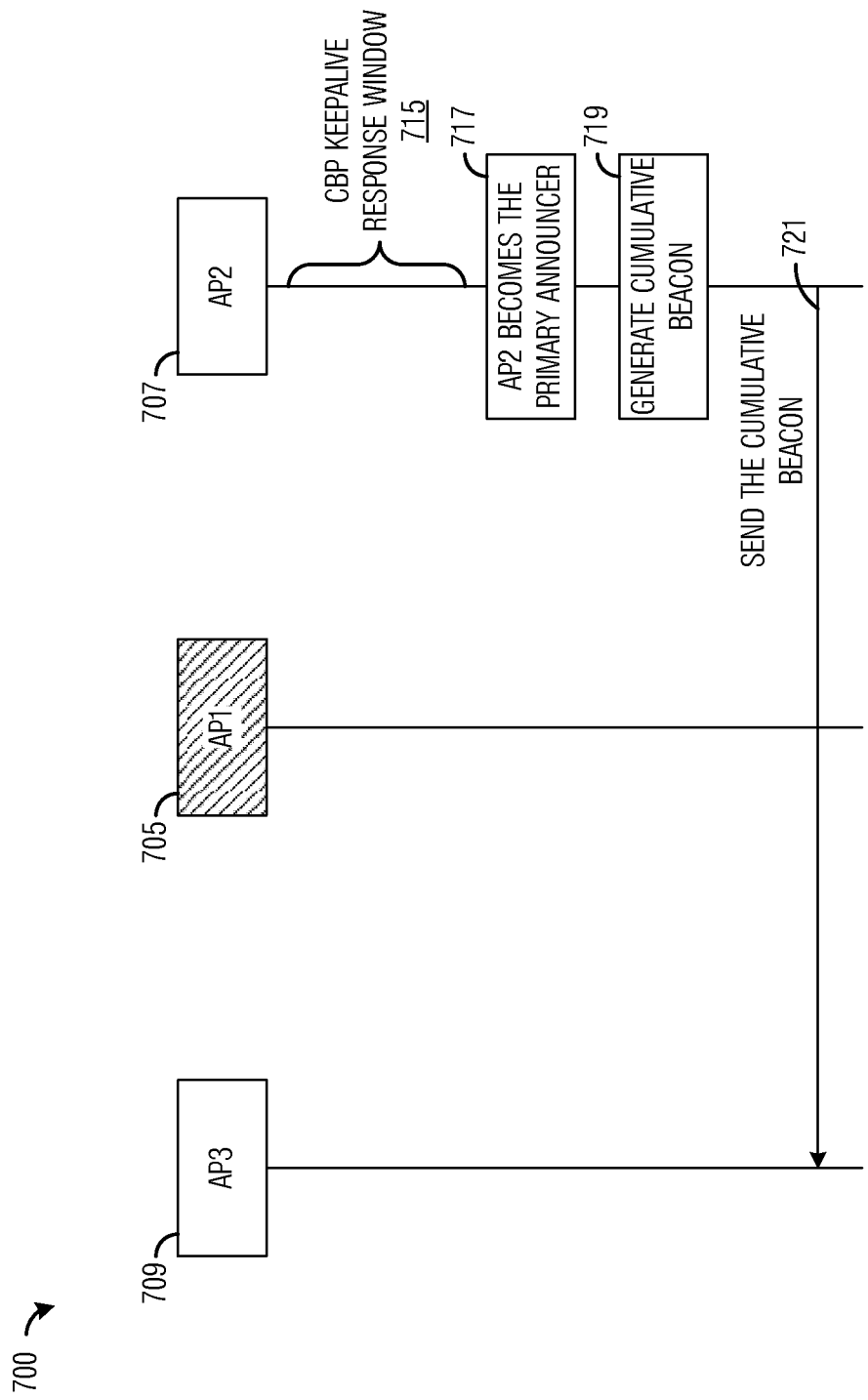
FIG. 7 illustrates a message exchange diagram highlighting an CBP based technique for promoting a backup announcer to primary announcer according to example embodiments described herein.

FIG. 7 illustrates a message exchange diagram 700 highlighting a CBP based technique for promoting a backup announcer to primary announcer. Message exchange diagram 700 displays transmissions and operations occurring at a first access point (AP1) 705, a second access point (AP2) 707, and a third access point (AP3) 709. As shown in FIG. 7, AP1 705 is operating as a primary announcer, AP2 707 is operating as a backup announcer, and AP3 709 is a participant in cumulative beacon operations.

AP2 707 may utilize a time-window to monitor CBP keepalive frames from AP1 705 (shown as time-span 715). The time-window may be referred to as a CBP keepalive response window. If the time-window elapses without AP2 707 receiving a CBP keepalive frame from AP1 705, AP2 707 may consider AP1 705 as having become inactive, failed, or otherwise stopped cumulative beacon operations. AP2 707 becomes the primary announcer (block 717). AP2 707 generates a CB (block 719). AP2 707 sends the CB in a CB frame, to AP3 709, for example (block 721). If there are other APs participating in cumulative beacon frame operations, AP2 707 also sends the CB to them as well. Alternatively, AP2 707 may broadcast the CB. Furthermore, one of the other APs participating in cumulative beacon operations may become a new backup announcer to take the place of AP2 707.

According to an alternative example embodiment, a non-CBP based technique for promoting APs to primary announcer and backup announcer is provided. An operator of the communications system or a technical standard may specify a sequence of APs that will serve as primary announcers and backup announcers and the APs in the sequence of APs will rotate serving as primary announcers and backup announcers. The use of the sequence of APs to rotate through different APs serving as primary announcers and backup announcers may help improve the coverage of the CBs. Alternatively, a determination rule is used to determine the primary announcers and the backup announcers.

Figure 8:
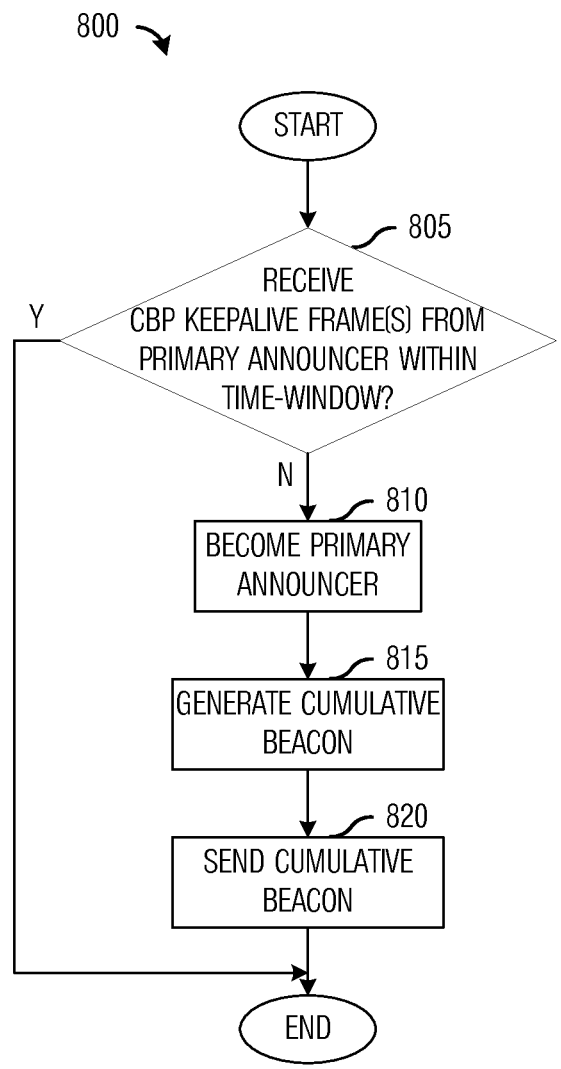
FIG. 8 illustrates a flow diagram of example operations occurring in an AP as the AP performs an CBP based technique to promote a backup announcer to a primary announcer

FIG. 8 illustrates a flow diagram of example operations 800 occurring in an AP as the AP performs a CBP based technique to promote a backup announcer to a primary announcer. Operations 800 may be indicative of operations occurring in an AP operating as a backup announcer as the AP performs an CBP based technique to promote a backup announcer to a primary announcer.

Operations 800 may begin with the AP performing a check to determine if it has received a CBP keepalive frame from the primary announcer within a time-window (block 805). If the AP has received a CBP keepalive frame from the primary announcer within the time-window, operations 800 may terminate.

If the AP has not received a CBP keepalive frame from the primary announcer within the time-window, the AP may determine that the primary announcer has become inactive, failed, or otherwise stopped cumulative beacon operations. The AP becomes a new primary announcer (block 810). The AP may generate a CB (block 815). The AP may send the CB in a CB frame (block 820). The CB frames may be broadcast by the AP serving as the new primary announcer on a single channel that is the same as the single channel used by the previous primary announcer. Alternatively, the AP serving as the new primary announcer uses a different channel to broadcast the CB frames.

Figure 9:
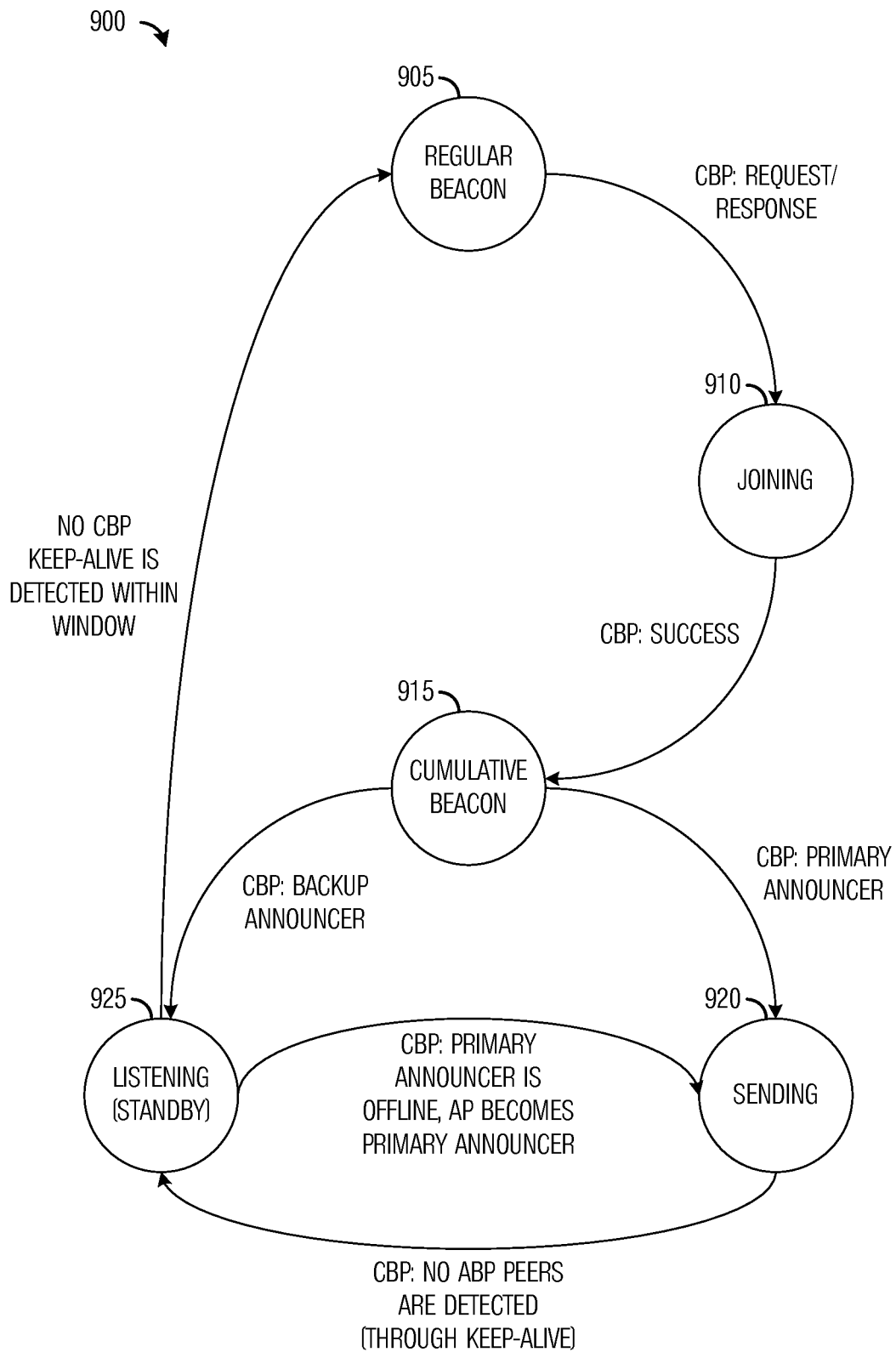
FIG. 9 illustrates an example state machine according to example embodiments described herein.

FIG. 9 illustrates an example state machine 900. State machine 900 highlights the operation of an AP capable of performing cumulative beacon operations. State machine 900 may initialize in a regular beacon state 905 where the AP will regularly transmit beacon frames. State machine 900 may transition to a joining state 910 when it receives or transmits a CBP request frame or a CBP response frame. In joining state 910 the AP may initiate a procedure to participate in cumulative frame operations, which may include AP discovery, adding to a list of APs participating in cumulative beacon operations, and so on.

If the procedure to participate in cumulative frame operation successfully completes, the AP may transition to cumulative beacon state 915. In cumulative beacon state 915, the AP is participating in cumulative beacon operations. The AP may participate in a CBP primary announcer procedure wherein one of the APs participating in cumulative beacon operations is designated as a primary announcer and another one of the APs participating in cumulative beacon operations is designated as a backup announcer.

If the AP is the primary announcer, the AP transitions to a sending state 920 where the AP generates a CB and sends the CB. If the AP is the backup announcer or another AP participating in cumulative beacon operations but not the primary announcer, the AP transitions to a listening state (or standby state) 925. In listening state 925, the AP listens for a CBP keepalive frame transmitted by the primary announcer. Upon receipt of a CBP keepalive frame, the AP responds with a CBP keepalive ACK.

If the AP is the primary announcer and sends CBP keepalive frames, the AP keeps track of CBP keepalive ACKs received in response to CBP keepalive frames that it sent. If an AP participating in cumulative beacon operations does not send back a CBP keepalive ACK within a specified time-window, the AP (the primary announcer) may remove information about the AP (the AP not responding with a CBP keepalive ACK in a timely manner) from the CB. If the AP receives no CBP keepalive ACKs within the specified time-window, it may determine that it has no peers and transitions to listening state 925.

If the AP is in listening state 925 and determines that the primary announcer has become inactive, failed, or otherwise stopped cumulative beacon operations (by receiving no CBP keepalive frames for a specified time-window) and if the AP is the backup announcer, the AP becomes the primary announcer and transitions to sending state 920. If the AP is in listening state 925 and receives no CBP keepalive frames within a specified time-window, the AP transitions back to normal operations and regular beacon state 905.

Figure 10A:
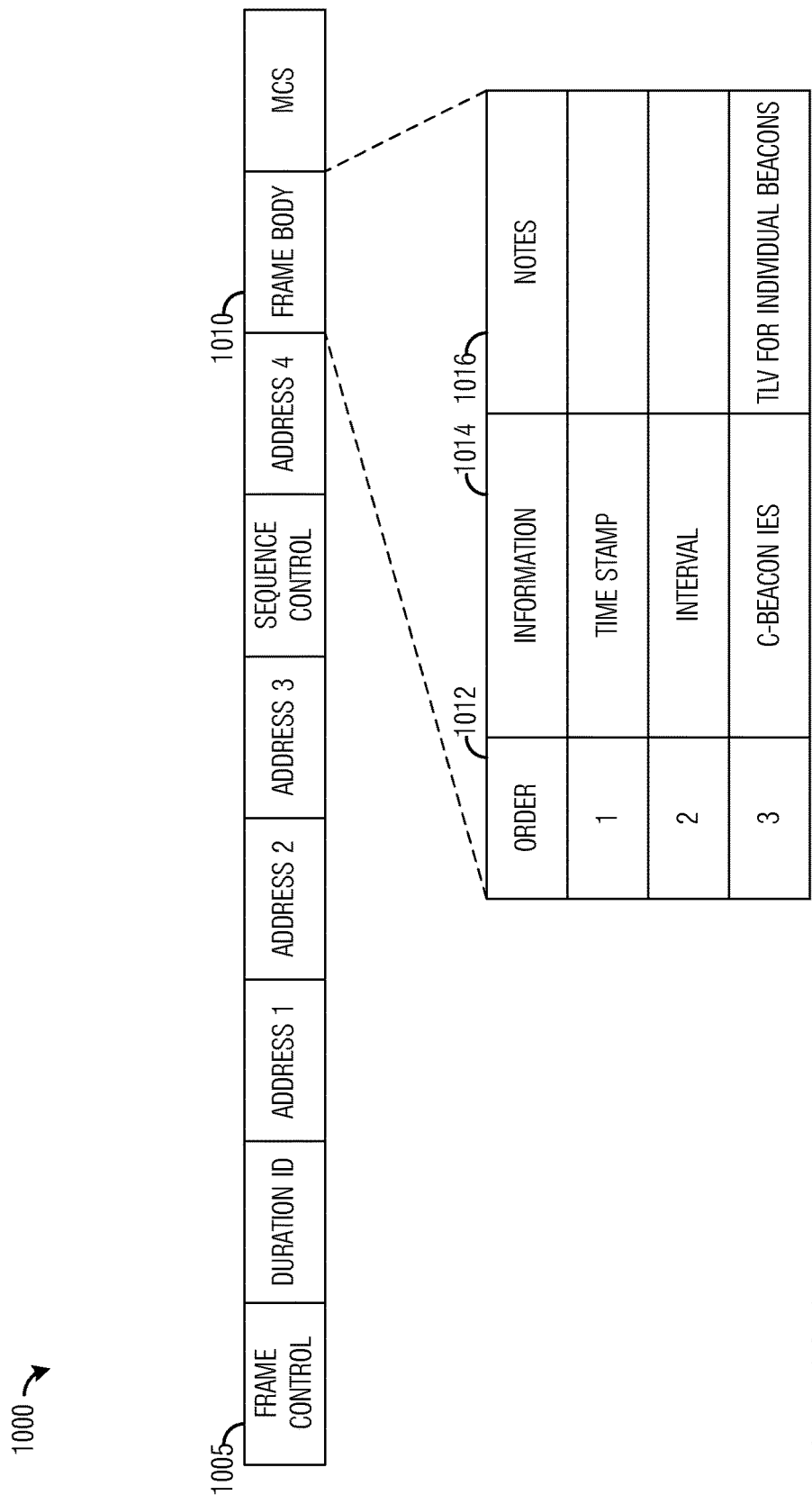
FIG. 10A illustrates a first example CB according to example embodiments described herein.

FIG. 10A illustrates a first example CB 1000. CB 1000 includes a frame control field 1005 that includes a subtype indicating that CB 1000 is a CB. CB 1000 also includes a frame body field 1010 that includes a time-stamp associated with CB 1000, an interval indicating an interval between CBs, and CB IEs that includes SSIDs, and BSSIDs of APs participating in cumulative beacon operations.

Figure 10B:
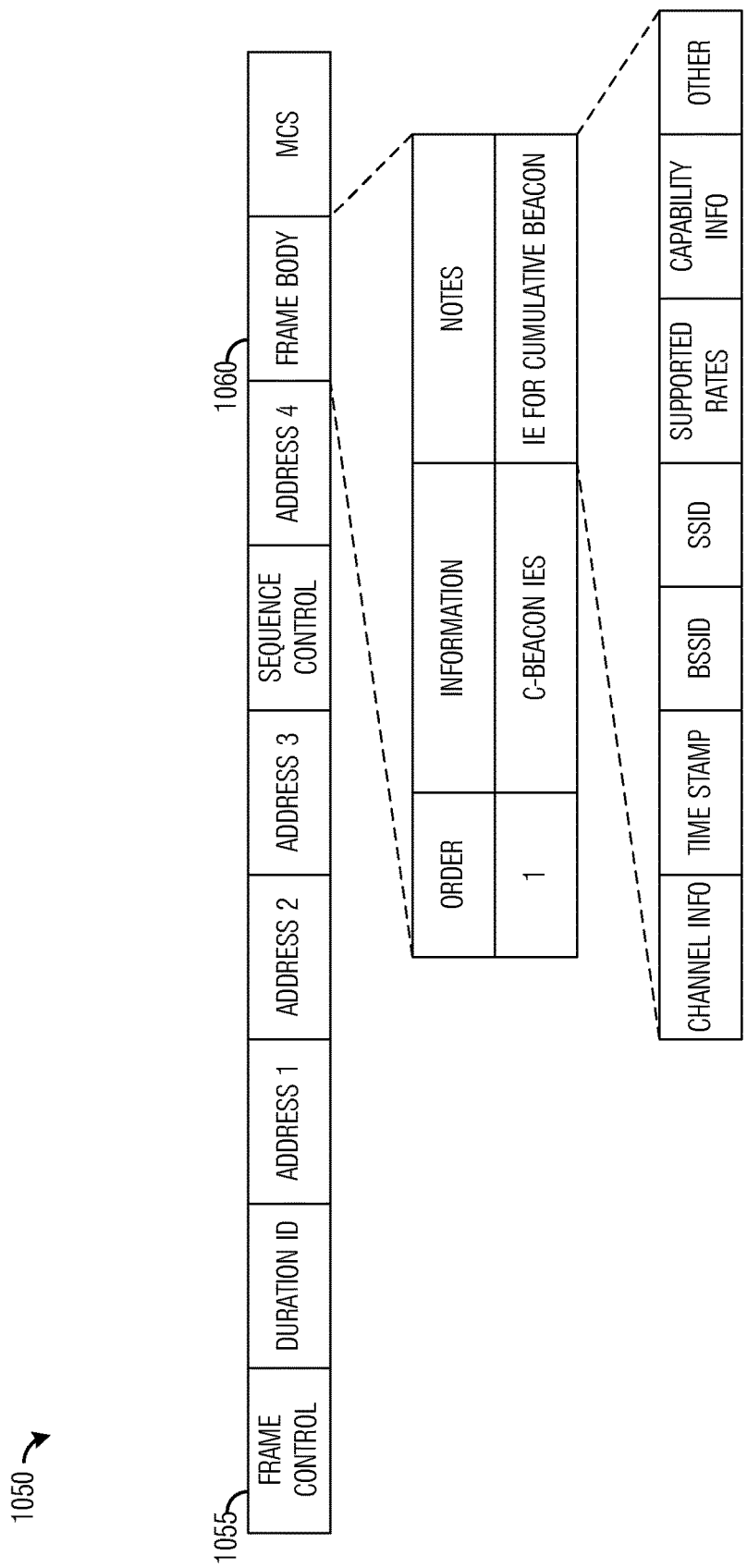
FIG. 10B illustrates a second example CB according to example embodiments described herein.

FIG. 10B illustrates a second example CB 1050. CB 1050 includes a frame control field 1055 that includes a subtype indicating that CB 1050 is a CB. CB 1050 also includes a frame body field 1060 that includes CB IEs that includes SSIDs, BSSIDs, as well as other capabilities of each of the APs participating in cumulative beacon operations. Examples of other capabilities may include supported data rates of the AP, capabilities of the APs, and so forth.

Figure 11:
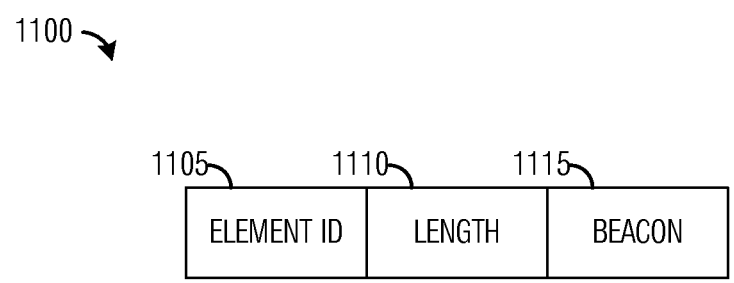
FIG. 11 illustrates an example CB IE according to example embodiments described herein.

FIG. 11 illustrates an example CB IE 1100. CB IE 1100 includes an element ID field 1105 that includes a subtype indicating that the IE is a CB IE, a length field 1110 that includes a value indicating the length of the CB IE, and a beacon field 1115 that includes the information for an AP associated with the CB IE.

Figure 12:
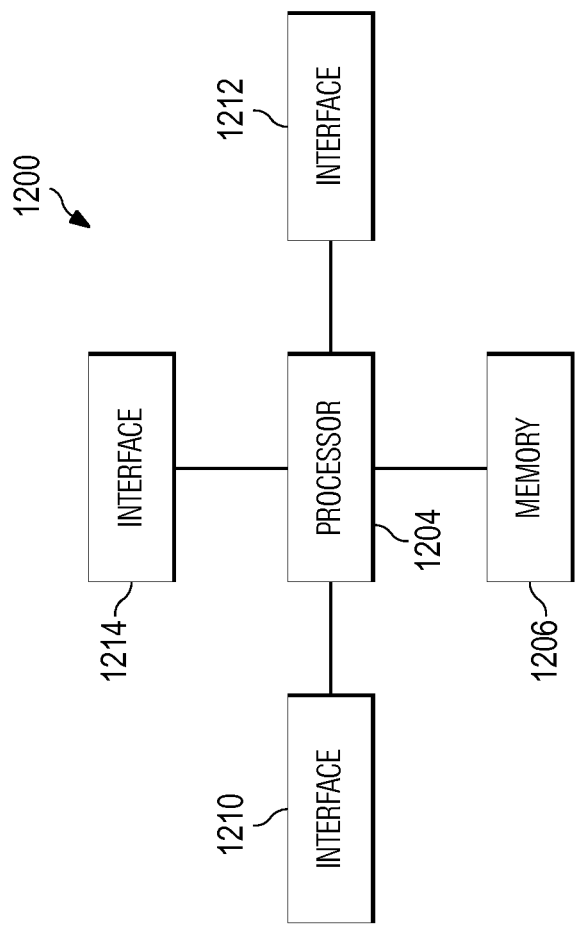
FIG. 12 illustrates a block diagram of an embodiment processing system for performing methods described herein.

FIG. 12 illustrates a block diagram of an embodiment processing system 1200 for performing methods described herein, which may be installed in a host device. As shown, the processing system 1200 includes a processor 1204, a memory 1206, and interfaces 1210-1214, which may (or may not) be arranged as shown in FIG. 12. The processor 1204 may be any component or collection of components adapted to perform computations and/or other processing related tasks, and the memory 1206 may be any component or collection of components adapted to store programming and/or instructions for execution by the processor 1204. In an embodiment, the memory 1206 includes a non-transitory computer readable medium. The interfaces 1210, 1212, 1214 may be any component or collection of components that allow the processing system 1200 to communicate with other devices/components and/or a user. For example, one or more of the interfaces 1210, 1212, 1214 may be adapted to communicate data, control, or management messages from the processor 1204 to applications installed on the host device and/or a remote device. As another example, one or more of the interfaces 1210, 1212, 1214 may be adapted to allow a user or user device (e.g., personal computer (PC), etc.) to interact/communicate with the processing system 1200. The processing system 1200 may include additional components not depicted in FIG. 12, such as long term storage (e.g., non-volatile memory, etc.).

In some embodiments, the processing system 1200 is included in a network device that is accessing, or part otherwise of, a telecommunications network. In one example, the processing system 1200 is in a network-side device in a wireless or wireline telecommunications network, such as a base station, a relay station, a scheduler, a controller, a gateway, a router, an applications server, or any other device in the telecommunications network. In other embodiments, the processing system 1200 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 13:
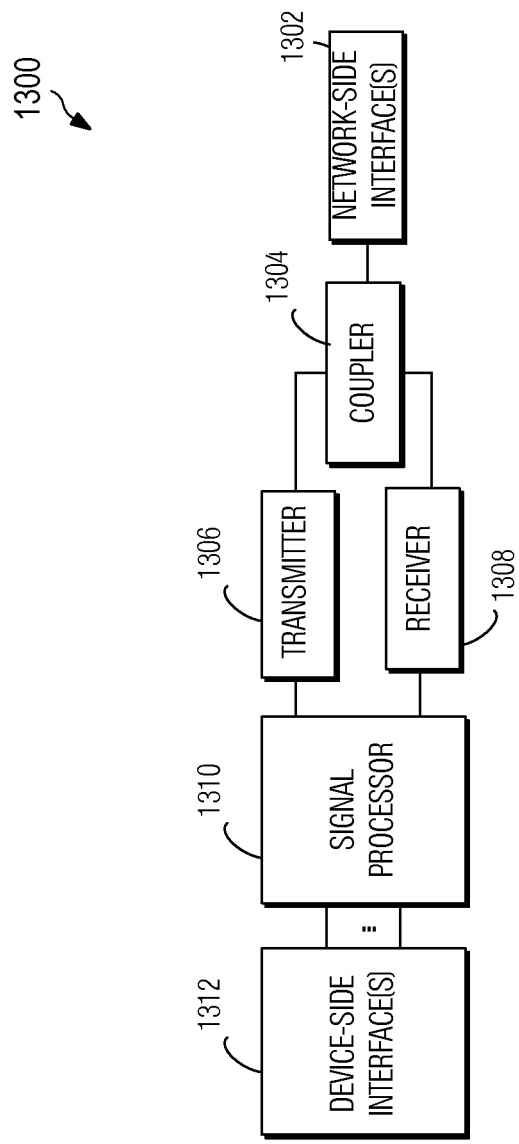
FIG. 13 illustrates a block diagram of a transceiver adapted to transmit and receive signaling over a telecommunications network according to example embodiments described herein.

In some embodiments, one or more of the interfaces 1210, 1212, 1214 connects the processing system 1200 to a transceiver adapted to transmit and receive signaling over the telecommunications network. FIG. 13 illustrates a block diagram of a transceiver 1300 adapted to transmit and receive signaling over a telecommunications network. The transceiver 1300 may be installed in a host device. As shown, the transceiver 1300 comprises a network-side interface 1302, a coupler 1304, a transmitter 1306, a receiver 1308, a signal processor 1310, and a device-side interface 1312. The network-side interface 1302 may include any component or collection of components adapted to transmit or receive signaling over a wireless or wireline telecommunications network. The coupler 1304 may include any component or collection of components adapted to facilitate bi-directional communication over the network-side interface 1302. The transmitter 1306 may include any component or collection of components (e.g., up-converter, power amplifier, etc.) adapted to convert a baseband signal into a modulated carrier signal suitable for transmission over the network-side interface 1302. The receiver 1308 may include any component or collection of components (e.g., down-converter, low noise amplifier, etc.) adapted to convert a carrier signal received over the network-side interface 1302 into a baseband signal. The signal processor 1310 may include any component or collection of components adapted to convert a baseband signal into a data signal suitable for communication over the device-side interface(s) 1312, or vice-versa. The device-side interface(s) 1312 may include any component or collection of components adapted to communicate data-signals between the signal processor 1310 and components within the host device (e.g., the processing system 1200, local area network (LAN) ports, etc.).

The transceiver 1300 may transmit and receive signaling over any type of communications medium. In some embodiments, the transceiver 1300 transmits and receives signaling over a wireless medium. For example, the transceiver 1300 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1302 comprises one or more antenna/radiating elements. For example, the network-side interface 1302 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1300 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Although the present disclosure and its advantages have been described in detail, it should be understood that various changes, substitutions and alterations can be made herein without departing from the spirit and scope of the disclosure as defined by the appended claims.

What is claimed is:

1. A method for operating a first access point comprising:
    generating, by the first access point of a first plurality of access points participating in cumulative beacon operations, a cumulative beacon including basic service set identifiers (BSSIDs) and service set identifiers (SSIDs) of access points in the first plurality of access points; and
    sending, by the first access point, the cumulative beacon.

2. The method of claim 1, wherein the cumulative beacon is one of broadcasted or multi-cast to the first plurality of access points.

3. The method of claim 1, further comprising:
    participating, by the first access point, in a cumulative beacon protocol (CBP) procedure to identify the first plurality of access points participating in cumulative beacon operations.

4. The method of claim 3, wherein participating in the CBP procedure comprises:
    sending, by the first access point, a CBP request frame to a second plurality of access points;
    receiving, by the first access point, CBP response frames from access points in the second plurality of access points; and
    adding, by the first access point, the first access point to the second plurality of access points to form the first plurality of access points.

5. The method of claim 1, wherein the BSSID and the SSID of each access point are included in a cumulative beacon information element (CB IE).

6. The method of claim 1, further comprising:
    sending, by the first access point, a CBP keepalive frame; and
    removing, by the first access point, an unresponsive access point from the first plurality of access points in response to a CBP keepalive acknowledgement frame not being received from the unresponsive access point within a specified time window after sending the CBP keepalive frame, thereby producing an updated first plurality of access points.

7. The method of claim 6, further comprising, in response to the CBP keepalive acknowledgement frame not being received from the unresponsive access point within the specified time window:
    generating, by the first access point, an updated cumulative beacon in accordance with the updated first plurality of access points; and
    sending, by the first access point, the updated cumulative beacon.

8. The method of claim 1, further comprising:
    participating, by the first access point, in an access point discovery procedure prior to generating the cumulative beacon.

9. The method of claim 1, wherein the first access point is operating as a primary announcer.

10. The method of claim 9, further comprising relinquishing, by the first access point, the operating as the primary announcer, wherein the relinquishing the operating as the primary announcer is configured to instruct one of other access points in the first plurality of access points to operate as the primary announcer.

11. The method of claim 1, wherein the first plurality of access points comprises access points belonging to a single overlapping basic service set (OBSS).

12. The method of claim 1, further comprising:
taking over, by the first access point, as a primary announcer from a second access point in the first plurality of access points.

13. The method of claim 12, wherein taking over as the primary announcer occurs in response to a CBP keepalive frame not being received from the second access point within a specified time-window.

14. The method of claim 12, wherein taking over as the primary announcer is in accordance with a pre-specified sequence of primary announcers.

15. The method of claim 12, wherein the cumulative beacon is sent on a first channel different from a second channel used by the second access point to send cumulative beacons.

16. An access point comprising: a processor; and a non-transitory computer readable storage medium storing programming for execution by the generate a cumulative beacon including basic service set identifiers (BSSIDs) and service set identifiers (SSIDs) of access points in a first plurality of access points participating in cumulative beacon operations, and send the cumulative beacon.

17. The access point of claim 16, wherein the programming comprises instructions to participate in a cumulative beacon protocol (CBP) procedure to identify the first plurality of access points participating in cumulative beacon operations.

18. The access point of claim 17, wherein the programming comprises instructions to send a CBP request frame, receive CBP response frames from access points in a second plurality of access points, and add the access point to the second plurality of access points to form the first plurality of access points.

19. The access point of claim 16, wherein the programming comprises instructions to send a CBP keepalive frame, and remove an unresponsive access point from the first plurality of access points in response to a CBP keepalive acknowledgement frame not being received from the unresponsive access point within a specified time window after sending the CBP keepalive frame, thereby producing an updated first plurality of access points.

20. The access point of claim 16, wherein the access point is operating as a primary announcer, wherein the programming comprises instructions to relinquish the operating as the primary announcer, wherein relinquishing the operating as the primary announcer is configured to instruct one of other access points in the first plurality of access points to operate as the primary announcer.

21. The access point of claim 16, wherein the programming comprises instructions to take over as a primary announcer from a second access point in the first plurality of access points.

22. The access point of claim 21, wherein the access point takes over as the primary announcer in response to a CBP keepalive frame not being received within a specified time-window.

23. The access point of claim 21, wherein the access point takes over as the primary announcer in accordance with a pre-specified sequence of primary announcers.

24. A method for transmitting a cumulative beacon, the method comprising:
generating, by a first access point of a plurality of access points participating in cumulative beacon operations, a cumulative beacon including a cumulative beacon information element for each access point in the plurality of access points; and
broadcasting, by the first access point, the cumulative beacon.

25. The method of claim 24, wherein each cumulative beacon information element includes a basic service set identifier (BSSID) and service set identifier (SSID) for an associated access point in the plurality of access points.

26. The method of claim 25, wherein each cumulative beacon information element includes a time stamp, supported rates, and capability information for the associated access point.

* * * * *